United States Patent Office 3,453,424
Patented July 1, 1969

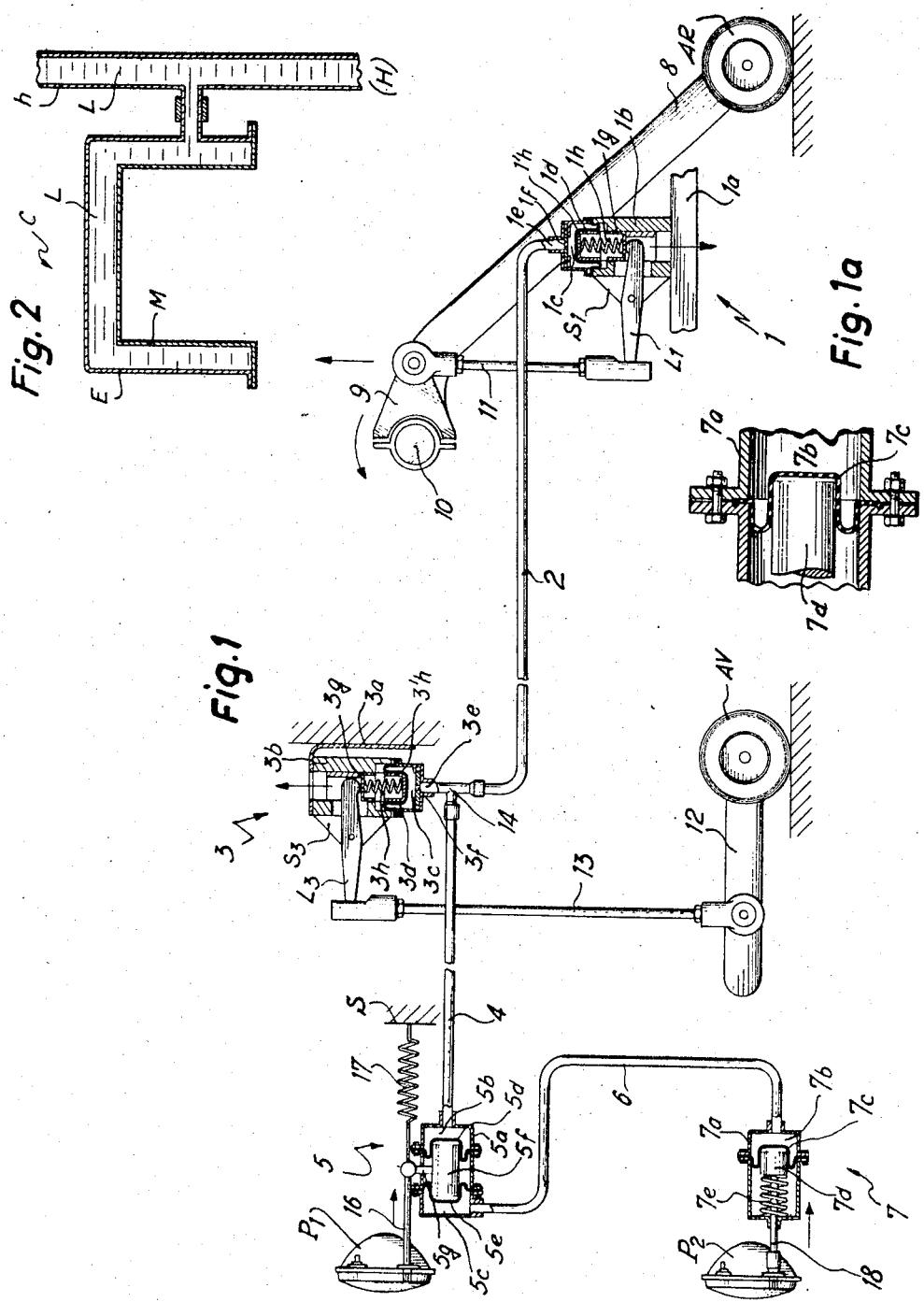

3,453,424
ARRANGEMENT FOR THE AUTOMATIC REGULATION OF THE ORIENTATION OF THE HEADLAMPS OF A VEHICLE
Pierre Cibie, Paris, France, assignor to Projecteurs Cibie, Bobigny, Seine-St.-Denis, France, a company of France
Filed Dec. 12, 1966, Ser. No. 601,193
Claims priority, application France, Dec. 14, 1965, 42,149; Feb. 18, 1966, 50,180; Mar. 29, 1966, 55,318
Int. Cl. B60q 1/10
U.S. Cl. 240—7.1    1 Claim

ABSTRACT OF THE DISCLOSURE

Assembly for automatically correcting the orientation of the headlamps of a vehicle. Two arms connected to the front and rear wheels respectively act on a control lever which is displaced in one direction or the other from a mean position. Each control lever acts on a hydraulic chamber and the chambers are coupled by a tubular circuit. A hydraulic control circuit is connected from one point of the tubular circuit to a variable volume chamber having a piston interposed between two flexible membranes. The displacement of the piston is transmitted to a first headlamp. A hollow cylinder connected to one end of the variable volume chamber is coupled to another chamber which controls the orientation of the second headlamp.

---

The present invention has as object an arrangement ensuring the automatic regulation of the orientation of the headlamps of a vehicle, and more particularly of an automobile vehicle, in relation to its attitude.

It is known that the suspension asemblies of an automobile vehicle increase in flexibility continuously and that, in modern vehicles, great variations of the attitude of the vehicle under the effect of variations in their load, their acceleration etc. result therefrom.

The headlamps of an automobile vehicle are in general integral with the suspended part of the vehicle and from this fact any variation in the attitude modifies the orientation of the headlamps. For example, if, in consequence of a bad static disposition of the load, the front axle of a vehicle is more heavily loaded than the back axle, the luminous beams of the headlamps of the vehicle will be in general too low, from the fact of the relative raising of the rear part of the vehicle. It is likewise known that a vehicle has a tendency to "rear" during acceleration with a raising of the beam of its headlamps, the opposite effect being produced on deceleration.

The arrangement according to the invention has the object of ensuring automatically the correct orientation of the headlamps whatever may be the attitude of the vehicle on which they are mounted in order on the one hand to obtain the optimum lighting of the carriage-way and on the other hand not to risk dazzling the users of the road coming from the opposite direction to the vehicle.

The arrangement according to the invention is an hydraulic arrangement of the type comprising two systems of mechanical transmission associated respectively with the front part and with the rear part of the vehicle and there serving for the detection of the movements of the suspended part of the vehicle in respect to the unsuspended part, each of these systems of transmission acting finally on a control lever the extremity of which is displaced in one direction or the other from a mean position.

More precisely the present invention concerns a regulating arrangement of the type previously described in which the extremity of each of the two control levers acts on an hydraulic transmitter comprising a chamber of variable volume, the displacement of the extremity of the lever being converted to a variation of volume of the chamber, the hydraulic outlets of the two transmitters being connected by an integrating hydraulic circuit, the transmitters being mounted in opposition with respect to this integrating circuit, a hydraulic control circuit going from one point of the integrator circuit to a transducer relay acting on a first headlamp, a connecting circuit, in series with the control circuit and the transducer relay going to a control unit of the second headlamp.

The transmitters are said to be "mounted in opposition with respect to the integrator circuit" because a lowering or raising relative to the suspended part with respect to the non-suspended part of the vehicle is translated, according as this movement is situated in the front or in the rear of the vehicle, into liquid-displacement effects of opposing senses in the integrator circuit. Likewise the circuit is called "integrator" in that displacement of the liquid is only produced in the event of a difference between the relative movements "front" and "rear," the displacement of liquid in one sense or the other being proportional to the amplitude of that difference in one sense or in another.

According to another feature of the invention each transmitter comprises a hollow body substantially cylindrical, at one extremity of which a flexible membrane delimits an hydraulic chamber of variable volume, the exit from the chamber comprising a calibrated orifice of small dimensions, the extremity of the control lever entering into the body of the cylinder at its extremity opposed to the chamber of variable volume and acting on a slide itself acting on the membrane by the intermediary of a transmission and buffer spring.

According to another feature of the invention the transducer relay comprises a hollow body substantially cylindrical at the two extremities of which two flexible membranes define two chambers of variable volume, the movable piston being interposed between the two membranes and in contact with them, the displacement of this piston being transmitted to the first headlamp.

According to another feature of the invention the control unit acting on the second headlamp is formed by a cylinder one extremity of which, closed by a flexible membrane, constitutes an hydraulic chamber of variable volume, the deformation of the membrane displacing, against the action of a spring, a piston connected to a rod controlling the orientation of the second headlamp.

According to another feature of the invention, elastic return means are associated with the piston of the transducer relay so that in case of the breaking of the connecting circuit the piston of the transducer relay remains in place, the first headlamp thus remaining correctly regulated, the spring of the control unit of the second headlamp then ensuring the lowering of the second headlamp.

According to another feature of the invention from the fact of the mounting in series of the hydraulic circuits going to the two headlamps, the elastic return means of the piston of the transducer relay provide that in case of the breaking of the control circuit and/or of the integrator circuit, both the headlamps are lowered to the maximum.

According to another feature of the invention means are provided for compensating the effect of variations of temperature on the functioning of the circuit.

In one embodiment, by a suitable choice of hydraulic liquid and of the material of the circuits, the variation in volume of the circuits (expansion or contraction brought about by a change of temperature), exactly compensates the concomitant variation of the volume of liquid which they contain. The compensation thus obtained for the whole of the system is only approximate but sufficient.

In a second embodiment, all the elements of the system are chosen as regards their dimensions and material so that variations of temperature do not have any severe effect on the precise functioning of the system.

The invention will now be described with reference to the accompanying drawings which show an embodiment of the invention but in no restrictive sense.

FIGURE 1 represents diagrammatically the arrangement according to the invention, the headlamps being represented in side view and the transmitter systems for mechanical transmission being represented with respect to the wheels of the vehicle without taking account of the relative dimension of the different elements in order to make understanding easier.

FIGURE 1a represents in partial section a part of the control unit of the second headlamp in order to make better understood the mounting of the membrane and of the associated piston and in a general way to make better understood the co-operation of the different slides or pistons and of the membranes of the two transmitters and of the transducer relay.

FIGURE 2 is a diagrammatic view illustrating the principle of compensation used.

On FIGURE 1 the front wheel having the reference AV, the back wheel AR, the first headlamp $P_1$, the second headlamp $P_2$, the back transmitter is designated by the reference 1, the integrator circuit by the reference 2, the front transmitter by the reference 3, the control circuit by the reference 4, the transducer relay by the reference 5, the connecting circuit by the reference 6 and the control unit of the second headlamp by the reference 7.

The transmitters 1 and 3, are mounted on two elements 1a and 3a integral with the suspended part of the vehicle. The transmission of the movement of the wheel AR to the transmitter 1 takes place by means of an arm 8 associated with the axle of the wheel AR, the displacement of which brings about the rotation of an element 9 about a shaft 10, the element 9 articulated with a substantially vertical link 11 the movement of translation of which, upwards or downwards, is finally transmitted to the control level $L_1$, associated with the transmitter 1; this control lever $L_1$ pivots about a support $S_1$ integral with 1a.

In the same way the relative movements of the front wheel are transmitted to the control level $L_3$ of the transmitter 3, by means of a horizontal arm 12 associated with the axle of the wheel AV, a transmission link being articulated on 12 and displacing vertically upwards or downwards in order to act finally on $L_3$. The lever $L_3$ is mounted pivotably on a support $S_3$ integral with 3a.

The transmitter 1 will now be described. It consists of a body 1b open at one of its extremities in order to allow the lever $L_1$ to pass through. At the other extremity of the body 1b it consists of a variable-volume hydraulic chamber 1c, delimited by a flexible membrane 1d.

The hydraulic exit 1e from the transmitter is provided with a calibrated orifice 1f.

The extremity of the lever $L_1$ acts on a slide 1g which, through a spring 1h, acts on the membrane 1d, for preference through a slide or hollow piston 1'h.

Thus, any displacement of the lever $L_1$ brings about a variation in the volume of the chamber 1c, the spring 1h acting as a buffer during the transmission of movement of the lever.

The transmitter 3 has a analogous construction and its different elements are referenced as follows: exterior body, 3b; variable-volume chamber, 3c; membrane, 3d; exit, 3e; calibrated exit orifice, 3f; slide, 3g; spring, 3h; slide, 3'h.

The exits 1e and 3e from the two transmitters are connected by the hydraulic integrating circuit 2.

The hydraulic control circuit starts from a point 14 of the integrator circuit, this point being situated for preference as near as possible to the front transmitter 3 in order to shorten as much as possible the control circuit.

From the preceding explanations it follows that a relative lowering of the suspended part at the rear of the vehicle is shown as an increase in the volume of the chamber 1c and a relative lowering of the front part of the vehicle is shown as a reduction in volume of the chamber 3c. Conversely a raising of the rear of the vehicle appears as a reduction of the volume of the chamber 1c while a raising of the front appears as an increase of the volume of the chamber 3c.

It may thus be said that the two transmitters, front and rear, 1 and 3, are mounted in opposition since the same effect (lowering or raising), at the front or at the rear tends to cause the fluid of the hydraulic integrator circuit to circulate in one sense or the other.

It is also for this that the circuit 2 plays its integrating role: in the case of the two identical movements to the front or to the rear no movement is transmitted to the fluid of the integrator circuit, then to the control circuit 4 branched at 14, which means that the headlamps remain fixed. In other words, the movement of the liquid in the integrator circuit, and in consequence the quantity of liquid passing into 14 from one circuit or the other depends on the difference of the relative movement at the front and at the rear of the vehicle.

The time-delay relay 5 consists of a body 5a containing at its two extremities two chambers 5b and 5c delimited respectively by flexible membranes 5d and 5e. Between the membranes is arranged a piston 5f which is connected by means of a rod 5g to the control rod 16 of the headlamp $P_1$. On the other hand the rod 5g is connected by a spring 17 to a fixed support S integral with the suspended part of the vehicle (elastic means of return).

The connecting circuit 6 leaves the chamber 5c and goes to the control unit 7 of the second headlamp $P_2$. The unit 7 consists of a body 7a, chamber 7b where the connecting circuit 6 joins, this chamber being delimited by a membrane 7c against which bears a piston 7d integral with the control rod 18 of the headlamp $P_2$, the piston 7d having a tendency always to be pushed against the membrane 7c by a spring 7e which bears on the one hand against the piston 7c, on the other hand against the extremity of the envelope 7a opposite to the chamber 7b.

The FIGURE 1a shows in detail the structure of the control unit 7. In a more general way the FIGURE 1a illustrates the mounting of the membranes 1d, 3d, 5d, 5e with respect to the pistons or slides which are respectively associated with them; as may be seen from FIGURE 2 the membrane, which is advantageously a very flexible membrane, made of a composite fabric of rubber and a material such as "Tergal," is gripped along its edge which is slightly expanded between two assembled flanges. Membranes of this kind are actually on the market under the mark "Bellofram." Because of its flexibility the membrane can follow with deformation all the displacements of the piston or slide which is associated with it, the deformations of the membrane creating precisely the volumetric variations of the associated chamber.

The overall functioning of the arrangement according to the invention is easy to understand. As has been seen, any dissymmetry in the relative front and rear movements brings about an entry or an exit of fluid in the control circuit 4 and, by the intermediary of the units 5, 6 and 7, a regulation of the headlamps $P_1$ and $P_2$.

In the case of acceleration of the vehicle, for example (front of vehicle raised; rear lowered), the different elements of the system are displaced in the sense indicated by the arrows and a certain volume of hydraulic liquid passes from the circuit 4 to the circuit 3. Under the action of the springs 17 and 7e, an identical volume of fluid leaves the chamber 7b which diminishes in volume, passes into the chamber 5c which increases in volume and leaves the chamber 5b which diminishes in volume. The pistons 5f and 7c are displaced towards the right by the same amount, from the fact of the identity of the sections of the bodies 7a and 5a and of the equality of the variations in volume of the chambers 5c and 7b. The headlamps $P_1$ and $P_2$, in consequence of the displacement of the pistons 5f and 7c, are lowered by the same angular value.

In the case of deceleration (lowering of the front and raising of the rear), the opposite phenomena are produced and the headlamps $P_1$ and $P_2$ are raised by the same angular value, the liquid of the hydraulic circuits having, this time, a motor role against the action of the springs 17 and 7e. Of course the combined effects of the springs 17 and 7e cannot bring about a significant deformation of the springs 1h and 3h by the intermediary of the hydraulic circuits. From this fact, each of the two assemblies (1c, 2, 3c, 4, 5b), and (5c, 6, 7b) works at constant volume.

It is important to note that in case of breaking the connecting circuit 2 or the control circuit 4 the springs 17 and 7e, which no longer encounter pressure forces opposed to their action (since the circuit 4 is, either directly or by the intermediary of the circuit 3, more or less emptied of its liquid) bring the two headlamps $P_1$ and $P_2$ to their maximum lowered position. This constitutes a notable security factor of the system according to the invention.

Likewise in case of the breaking of the connecting circuit 6, the spring 7e bearing on the piston 7d brings the headlamp $P_2$ to its maximum lowered position and the spring 5d suffices to keep immobile the piston 5f while keeping the headlamp $P_1$ correctly regulated.

The system according to the invention is thus particularly safe, the mounting in series of the circuits 4 and 6 by the intermediary of the transducer relay 5 assuring in addition an absolutely identical regulation of the two headlamps.

The present invention is not limited to the embodiment described here but extends to all the variants in conformity with its spirit. In particular the mechanical transmission system of the movements relative to the control lever of each of the transmitters can be of any type different from the type shown. Moreover there can be incorporated in the circuit expansion-compensating means to nullify the effect of the differences of expansion of the different elements of the system under the effect of significant variations in temperature.

For this purpose, according to a further method of achieving compensation of the system according to the invention, the hydraulic circuits 2, 4 and 6 are formed by a tube or a pipe filled with hydraulic liquid and the coefficient of cubic expansion of the liquid is substantially equal to three times the linear coefficient of expansion of the tube, in such a way that at all the points of the circuits 2, 4, 6, the expansion or the contraction of the tube casing exactly compensates the variation of volume proper to the liquid which they contain.

From the fact that the volume of the circuits 2, 4, 6 represents, particularly in the embodiment in FIGURE 1, the greater part of the total volume of the hydraulic system used according to the invention, the compensation thus achieved in an exact way only on the circuits 2, 4 and 6 is converted, for the totality of the system, into an approximate compensation which is quite sufficient in practice.

After numerous experiments, it has been discovered that it was particularly advantageous to carry out the circuits in the following way:

The liquid consists of a mixture of water and glycerine in the respective proportions of 40–50% and of 60–50% by volume.

The tube casing of the circuits is carried out in a polyamide, for example in a polyamide commercially available under the mark Nylon or the mark Rilsan.

In a typical example the hydraulic liquid is a mixture of 50% glycerine and 50% water which corresponds to a coefficient of expansion of $4.5 \times 10^{-4}$, the polyamide having a coefficient of linear expansion of $1.5 \times 10^{-4}$.

In addition, to avoid acquisition of moisture, the internal wall (and possibly the external wall) of the tubes of the circuits can be given a water-tight coating, particularly of polypropylene.

In a second embodiment of the compensation system according to the invention the dimensions and the material of all the organs of the system are chosen in such a way that variations of temperature have no serious effect on the functioning and the precision of the system.

FIGURE 2 is a diagram showing the principle of compensation which is used.

In FIGURE 2 is shown in section a compensation chamber C mounted independently on a hydraulic circuit H of which one piping element h only has been shown. This chamber consists of a cylindrical envelope E in plastic material, in the interior of which is mounted a metallic cylinder M full or empty. The hydraulic liquid L passes freely from a pipe H to the compensation chamber C.

The qualitative functioning of such a compensation system is easy to understand: during an increase of ambient temperature the liquid of the hydraulic circuit expands more than its envelope. There normally results therefrom a disturbance of the functioning of the circuit corresponding to the difference between the expansion of the liquid and the expansion of the circuit properly so-called which contains it. In the compensation chamber the expansion of the metallic volume M is less than the expansion of the envelope E. There results an increase of the volume of the compensation chamber which can compensate exactly for the difference between the expansion of the liquid and the expansion of the circuit properly so-called.

A (very simple) quantitative explanation can be given.
In a given reference condition let:

$V_1$ be the interior volume of the enclosed space E and $\alpha$ its coefficient of expansion, $V_2$ the volume of the metallic assembly H and $\beta$ its coefficient of expansion, $V_L$ the total volume of the hydraulic circuit H the envelope of which one supposes has $\alpha$ as coefficient of expansion likewise, the hydraulic liquid L having itself, a coefficient of expansion $\gamma$.

When the reference temperature increases by a quantity $t$, the variation in the volume of the compensation chamber is equal to:

$$V_1(\alpha-\gamma)t - V_2(\beta-\gamma)t$$

On the other hand the difference between the variations in volume of the liquid of the circuit H and the variation in volume of the circuit properly so-called is equal to:

$$V_L(\gamma-\alpha)t$$

In order that the volume of the concentration chamber may increase for an increase of temperature $t$, it is necessary that the following inequation be satisfied:

$$\frac{V_1}{V_2} < \frac{\gamma-\beta}{\gamma-\alpha}$$

Finally, the equation for exact compensation is independent of temperatures since it is written:

$$V_L(\gamma-\alpha) = V_1(\alpha-\gamma) - V_2(\beta-\gamma)$$

The inequation and equation which precede can be easily satisfied by a suitable choice of the parameters $V_1$ and $V_2$, $\alpha$, $\beta$, the coefficient of expansion $\gamma$ being able, moreover, itself to form the object of a choice.

In practice, very satisfactory results are obtained with the following choices:

Hydraulic liquid: A classical oil for hydraulic circuits of the Lockheed, vaseline oil type—coefficient of expansion: $600 \times 10^{-6}$ Envelope of the circuit and envelope E of the compensation chamber: Polyamide for example Rilsan—coefficient of expansion: $450 \times 10^{-6}$ Metal M: Steel, coefficient of expansion: $36 \times 10^{-6}$ The hydraulic circuit of FIGURE 1 includes a chamber $1c$ delimited by its exterior envelope and the piston $1'h$, a pipe 2, a chamber $3c$ delimited by an exterior envelope and a piston $3'h$, a pipe 4, two chambers $5b$ and $5c$ delimited by exterior envelopes and a double piston $5f$, a pipe 6, a chamber $7b$ delimited by an exterior envelope $7a$ and a piston $7d$.

According to the invention one achieves compensation of the circuit by using one or more of the chambers $1c$, $3c$, $5b$, $5c$, $7b$ as compensation chambers, their exterior envelope being, for example, carried out in Rilsan, the same as the circuit element 2, 4 and 6.

When the pistons or slides $1'd$, $3'd$, $5f$ and $7d$ are carried out in steel, the hydraulic liquid filling the circuits being an oil of the previously mentioned type, exact compensation is obtained for a total volume of the system of 35 cc. by choosing a metallic volume (total volume of the pistons) of 15 cc., the pistons $1'h$, $3'h$, $7d$ having, for example, a volume of 3 cc. and the piston $5f$ a volume of 6 cc.

What I claim is:

1. An arrangement for the automatic control of the orientation of headlamps of a vehicle in relation to its attitude, comprising a vehicle having front and rear wheels, arm means connected to each of the wheels at one end and pivotally mounted at the other, lever means having one end connecting an intermediate portion of said arms for transmitting displacement of said wheels, control means pivotally mounted from a support frame of said vehicle, one end of each control means being displaceable from a mean position by the other end of said control means, said other end of each control means being applied to a slide means positioned within a chamber, said chamber having one end formed by a further slide means, a spring for biasing apart each of said slide means within said chamber, a membrane mounted within the chamber and above said further slide means and forming a part of a variable volume chamber, transducer relay means including another variable volume chamber having a pair of spaced membranes within said chamber mounted therein, said spaced membranes being interposed by a piston mounted between said spaced membranes, tublar means coupled between said chambers of said slide means and one of said chambers of said transducer relay means, transducer means including a chamber with an end wall having a membrane therein, a transducer piston disposed between the other end wall of said chamber and the membrane, said relay piston and said transducer piston being separately connected to pivotally mounted headlamps, and spring return means connected to said headlamps so that if breakdown of the tubular means occurs, the headlamps both are automatically lowered.

References Cited
UNITED STATES PATENTS

| 1,365,279 | 1/1921 | Ryan | 240—62.3 |
|---|---|---|---|
| 2,250,734 | 7/1941 | Thompson et al. | 240—62.3 |
| 3,177,355 | 4/1965 | Trowbridge | 240—7.1 |
| 3,336,470 | 8/1967 | Sombardier | 240—7.1 |
| 3,370,162 | 2/1968 | Henry-Biabaud | 240—62 |

FOREIGN PATENTS 1,407,221  6/1965  France.

NORTON ANSHER, *Primary Examiner.*

C. E. SMITH, *Assistant Examiner.*

U.S. Cl. X.R.

240—61.1, 62.62